United States Patent
Li

(10) Patent No.: US 10,552,660 B2
(45) Date of Patent: Feb. 4, 2020

(54) METHOD, APPARATUS AND COMPUTER-READABLE MEDIUM FOR FINGERPRINT IDENTIFICATION

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 34 days.

(21) Appl. No.: 15/823,861

(22) Filed: Nov. 28, 2017

(65) Prior Publication Data
US 2018/0165507 A1    Jun. 14, 2018

(30) Foreign Application Priority Data
Dec. 12, 2016    (CN) .......................... 2016 1 1141044

(51) Int. Cl.
G06K 9/00    (2006.01)
G06F 3/044    (2006.01)
G06K 9/64    (2006.01)

(52) U.S. Cl.
CPC ......... G06K 9/00087 (2013.01); G06F 3/044 (2013.01); G06K 9/0002 (2013.01); G06K 9/00006 (2013.01); G06K 9/00067 (2013.01); G06K 9/64 (2013.01)

(58) Field of Classification Search
CPC combination set(s) only.
See application file for complete search history.

(56) References Cited

U.S. PATENT DOCUMENTS

2003/0142856 A1*  7/2003  McClurg ............ G06K 9/00013
                                                    382/124
2009/0252385 A1* 10/2009  Dean .................... G06K 9/0002
                                                    382/124
(Continued)

FOREIGN PATENT DOCUMENTS

CN        105260105 A      1/2016
CN        106055957 A     10/2016
(Continued)

OTHER PUBLICATIONS

Extended European Search Report dated Apr. 30, 2018 in Patent Application No. 17205004.9.
(Continued)

*Primary Examiner* — Zhiyu Lu
(74) *Attorney, Agent, or Firm* — Oblon, McClelland, Maier & Neustadt, L.L.P.

(57) ABSTRACT

The disclosure relates to a method, apparatus and computer-readable medium for fingerprint identification. The method includes detecting a contact of an object with a fingerprint identification area of a terminal, wherein the contact of the object covers a contact area on the fingerprint identification area; acquiring characteristic information of the contact area; determining whether the contact area includes a fingerprint based on the characteristic information; performing fingerprint identification when it is determined that the contact area includes the fingerprint; and maintaining a sleep state when it is determined that the contact area does not include the fingerprint.

12 Claims, 6 Drawing Sheets

(56) References Cited

U.S. PATENT DOCUMENTS

| | | | |
|---|---|---|---|
| 2014/0301616 A1* | 10/2014 | Picard | G06K 9/00107 |
| | | | 382/125 |
| 2016/0188023 A1* | 6/2016 | Chang | G06K 9/00013 |
| | | | 345/173 |
| 2016/0246396 A1 | 8/2016 | Dickinson et al. | |
| 2017/0177919 A1* | 6/2017 | Wang | G06F 3/044 |
| 2018/0032785 A1* | 2/2018 | Li | G06F 3/0484 |

FOREIGN PATENT DOCUMENTS

| | | |
|---|---|---|
| CN | 106066685 A | 11/2016 |
| WO | WO 2016/036456 A1 | 3/2016 |
| WO | WO 2016/133602 A1 | 8/2016 |

OTHER PUBLICATIONS

Combined Chinese Office Action and Search Report dated Mar. 19, 2019 in corresponding Chinese Patent Application No. 201611141044.1 (with English Translation of Category of Cited Documents), 8 pages.

* cited by examiner

METHOD, APPARATUS AND COMPUTER-READABLE MEDIUM FOR FINGERPRINT IDENTIFICATION

CROSS-REFERENCE TO RELATED APPLICATION

This application is based on and claims priority to Chinese Patent Application No. 201611141044.1, filed on Dec. 12, 2016, the entire contents of which are incorporated herein by reference.

FIELD

The present disclosure generally relates to terminal technologies, and more particularly to a method, apparatus and computer-readable medium for fingerprint identification.

BACKGROUND

With the development of terminal technologies, a lot of terminals have the capability of fingerprint identification. The fingerprint identification may be implemented by collecting a user's fingerprint and matching it with a pre-stored fingerprint template such that a particular function of a terminal, such as unlocking of a screen, decryption of an application, mobile payment and the like, can be implemented based on the result of the match.

For a fingerprint identification process, the terminal may start a fingerprint identification function once the terminal detects the user's skin by a fingerprint identification module, then the terminal may perform fingerprint collection and fingerprint matching, and may perform subsequent functions based on the result of a fingerprint match. This process, however, may be executed even during contact of non-fingerprint skin, and may attempt to perform the fingerprint identification functions, thus wasting power.

SUMMARY

This summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for fingerprint identification. The method includes detecting a contact of an object with a fingerprint identification area of a terminal, wherein the contact of the object covers a contact area on the fingerprint identification area; acquiring characteristic information of the contact area; determining whether the contact area includes a fingerprint based on the characteristic information; performing fingerprint identification when it is determined that the contact area includes the fingerprint; and maintaining a sleep state when it is determined that the contact area does not include the fingerprint.

Acquiring the characteristic information of the contact area includes acquiring a section image of the contact area and extracting a characteristic point of the contact area from the section image; determining whether the characteristic point is consistent with a fingerprint characteristic; determining that the contact area includes the fingerprint when the characteristic point is consistent with the fingerprint characteristic; and determining that the contact area does not include the fingerprint when the characteristic point is not consistent with the fingerprint characteristic.

Acquiring the characteristic information of the contact area also includes acquiring contour information of the contact area, the contour information indicating an edge shape of the contact area; determining whether the edge shape indicated by the contour information is an oval; determining that the contact area includes the fingerprint when the edge shape is an oval; and determining that the contact area does not include the fingerprint when the edge shape is not an oval.

The method also includes maintaining a terminal system in a sleep state and ignoring the contact when the terminal system is in the sleep state and it is determined that the contact area does not include the fingerprint.

Acquisition of the characteristic information and determination of the contact area is performed by a fingerprint identification integrated circuit (IC) within the fingerprint identification area.

Aspects of the disclosure also provide an apparatus for fingerprint identification. The apparatus includes a processor and a memory configured to store instructions executable by the processor. The processor is configured to detect a contact of an object with a fingerprint identification area of a terminal, wherein the contact of the object covers a contact area on the fingerprint identification area; acquire characteristic information of the contact area; determine whether the contact area includes a fingerprint based on the characteristic information; perform fingerprint identification when it is determined that the contact area includes the fingerprint; and maintain a sleep state when it is determined that the contact area does not include the fingerprint.

The processor is also configured to acquire a section image of the contact area and extract a characteristic point of the contact area from the section image; determine whether the characteristic point is consistent with a fingerprint characteristic; determine that the contact area includes the fingerprint when the characteristic point is consistent with the fingerprint characteristic; and determine that the contact area does not include the fingerprint when the characteristic point is not consistent with the fingerprint characteristic.

The processor is also configured to acquire contour information of the contact area, the contour information indicating an edge shape of the contact area; determine whether the edge shape indicated by the contour information is an oval; determine that the contact area includes the fingerprint when the edge shape is an oval; and determine that the contact area does not include the fingerprint when the edge shape is not an oval.

The processor is also configured to maintain a terminal system in a sleep state and ignore the contact when the terminal system is in the sleep state and it is determined that the contact area does not include the fingerprint.

The apparatus is applied to a fingerprint identification integrated circuit (IC) within the fingerprint identification area.

Aspects of the disclosure also provide a non-transitory computer-readable medium having instructions stored thereon that when executed by one or more processors of a terminal, cause the terminal to detect a contact of an object with a fingerprint identification area of a terminal, wherein the contact of the object covers a contact area on the fingerprint identification area; acquire characteristic information of the contact area; determine whether the contact area includes a fingerprint based on the characteristic information; perform fingerprint identification when it is determined that the contact area includes the fingerprint; and maintain a sleep state when it is determined that the contact area does not include the fingerprint.

The instructions also cause the terminal to acquire a section image of the contact area and extract a characteristic point of the contact area from the section image; determine whether the characteristic point is consistent with a fingerprint characteristic; determine that the contact area includes the fingerprint when the characteristic point is consistent with the fingerprint characteristic; and determine that the contact area does not include the fingerprint when the characteristic point is not consistent with the fingerprint characteristic.

The instructions also cause the terminal to acquire contour information of the contact area, the contour information indicating an edge shape of the contact area; determine whether the edge shape indicated by the contour information is an oval; determine that the contact area includes the fingerprint when the edge shape is an oval; and determine that the contact area does not include the fingerprint when the edge shape is not an oval.

The instructions also cause the terminal to maintain a terminal system in a sleep state and ignore the contact when the terminal system is in the sleep state and it is determined that the contact area does not include the fingerprint.

It is to be understood that both the forgoing general description and the following detailed description are exemplary and illustrative only, and do not limit the scope of the disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
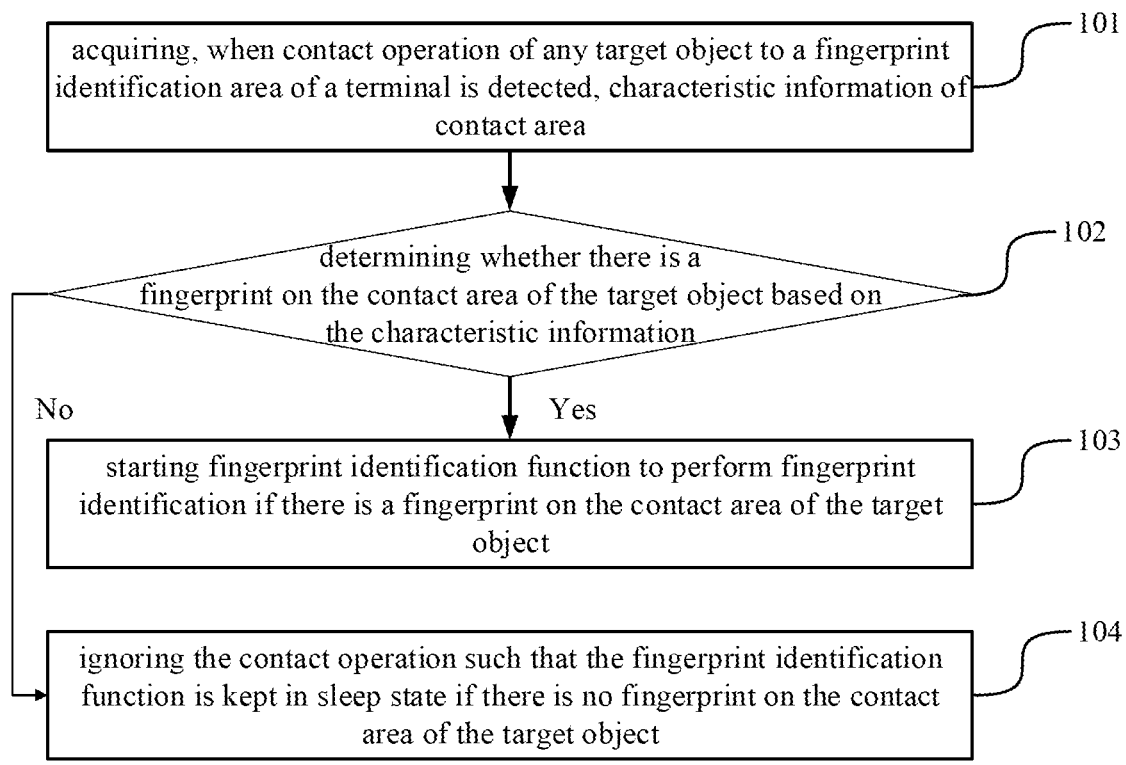
FIG. 1 is a flow chart illustrating a method for fingerprint identification according to an exemplary aspect of the present disclosure.

FIG. 1 is a flow chart illustrating a method for fingerprint identification according to an exemplary aspect. As shown in FIG. 1, the method may be applied in a terminal and includes following steps.

In step 101, when contact operation of any target object to a fingerprint identification area of a terminal is detected, characteristic information of contact area is acquired.

In step 102, it is determined whether there is a fingerprint on the contact area of the target object based on the characteristic information.

In step 103, fingerprint identification function is started to perform fingerprint identification if there is a fingerprint on the contact area of the target object.

In step 104, the contact operation is ignored such that the fingerprint identification function is kept in sleep state if there is no fingerprint on the contact area of the target object.

In the method provided in the aspect of the present disclosure, when the contact operation to the fingerprint identification area is detected, it is first determined whether the target object is a user's finger, that is, whether there is a fingerprint on the contact area of the target object. If the target object is a user's finger, the contact operation is valid, and then the fingerprint identification function would be started to perform fingerprint identification. If the target object is not a user's finger, the fingerprint identification function would not be started. As a result, unnecessary power consumption due to some misoperations can be avoided.

In an optional implementation, acquisition of the characteristic information of the contact area may include: acquiring section image of the contact area and extracting a characteristic point of the contact area from the section image; or acquiring contour information of the contact area, the contour information indicating edge shape of the contact area.

In an optional implementation, determining whether there is a fingerprint on the contact area of the target object based on the characteristic information may include: in the event that the characteristic information is the characteristic point, determining whether the characteristic point is consistent with fingerprint characteristic, making a determination that there is a fingerprint on the contact area of the target object if the characteristic point is consistent with the fingerprint characteristic, and making a determination that there is no fingerprint on the contact area of the target object if the characteristic point is not consistent with the fingerprint characteristic; or in the event that the characteristic information is the contour information, determining whether the edge shape indicated by the contour information is an oval, making a determination that there is a fingerprint on the contact area of the target object if the edge shape is an oval, and making a determination that there is no fingerprint on the contact area of the target object if the edge shape is not an oval.

In an optional implementation, the method may further include: if the terminal system is in sleep state and it is determined that there is no fingerprint on the contact area of the target object, keeping the terminal system in the sleep state while ignoring the contact operation.

In an optional implementation, acquisition of the characteristic information and determination of the contact area may be performed by a fingerprint identification circuit integrated circuit (IC) within the fingerprint identification area.

The above optional technical solutions may be combined in any way to form optional aspects of the present disclosure, which is omitted herein for concision.

Figure 2A:
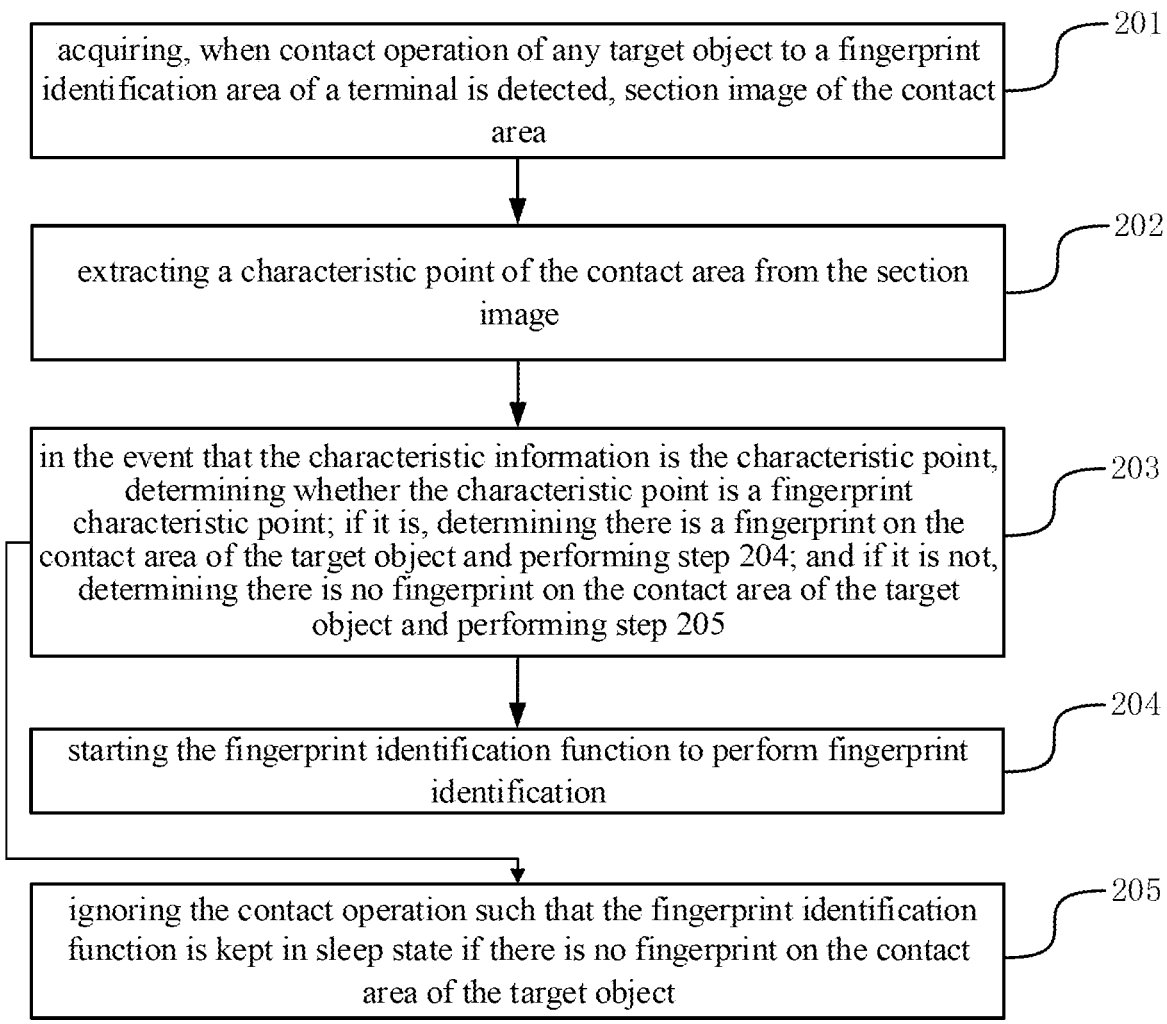
FIG. 2A is a flow chart illustrating a method for fingerprint identification according to an exemplary aspect of the present disclosure.

FIG. 2A is a flow chart illustrating a method for fingerprint identification according to an exemplary aspect. As shown in FIG. 2A, the method may be applied in a terminal and include following steps.

In step 201, when contact operation of any target object to a fingerprint identification area of a terminal is detected, section image of the contact area is acquired.

For any terminal capable of fingerprint identification function, there is at least one fingerprint identification area within which there is a fingerprint identification circuit IC. The section image of the contact area where the target object contacts the fingerprint identification area may be acquired by a silicon crystal sensor (e.g., a capacitive fingerprint sensor, a temperature fingerprint sensor, etc.), optical or ultrasonic scanning and so on. The section image may reflect some characteristics of the target object to some extent, such that the terminal may determine whether the target object is a fingerprint based on the characteristics.

In an optional implementation, in order to improve accuracy of fingerprint determination, after acquiring the section image, image enhancement process may be performed to the section image. The image enhancement process may reduce noise, increase contrast between ridges and valleys, and the like, thus identification resolution of the section image may be improved.

In an optional implementation, during the acquisition of the section image, dpi for sampling may be adjusted to a value that is below a common dpi for sampling (e.g., the sampling used during current fingerprint identification), such that power consumption during this process may be reduced.

In step 202, the characteristic point of the contact area is extracted from the section image.

In the event of extracting the characteristic point of the contact area, coordinates of bifurcations, terminations or rings in the section image may be extracted. Also, some points such as center points, triangle points, end points, bifurcate points, bridge nodes, etc. can be extracted. Furthermore, some auxiliary features, such as pattern of the fingerprint, density of the fingerprint, curvature of the fingerprint and so on can be extracted.

The number of the characteristic points may be adjusted based on requirement for determination precision. If higher determination precision is required, the number of the characteristic points may be set to be a large value. If lower determination precision is required, the number of the characteristic points may be set to be a small value. The lower limit of the number specifically set may be a value which would not affect normal use of the fingerprint identification function. The aspects of the present disclosure are not limited in this respect.

Above steps 201-202 form a possible implementation to acquire the characteristic information of the contact area. In another aspect, steps 201-202 may be replaced by following operations: acquiring contour information of the contact area when contact operation of any target object to the fingerprint identification area of the terminal is detected, the contour information indicating the edge shape of the contact area. The inventors realize when the user touches the fingerprint identification area by his finger, the touch would lead to change of the shape of the finger. The changed shape generally presents an approximate oval. Thus, it can be determined whether there is a fingerprint on the contact area by determining the edge shape.

In step 203, in the event that the characteristic information is the characteristic point, it is determined whether the characteristic point is consistent with fingerprint characteristic; if the characteristic point is consistent with the fingerprint characteristic, a determination that there is a fingerprint on the contact area of the target object is made; and if the characteristic point is not consistent with the fingerprint characteristic, a determination that there is no fingerprint on the contact area of the target object is made and then step 205 is performed.

The inventors realize a fingerprint has some particular detail characteristic points, such as, points formed by interruption, bifurcation or turning in the fingerprint. These detail characteristic points may provide unique confirmation information for the fingerprint. Typical detail characteristic points may include end points and bifurcation points and fork points, isolated points, ring points, short lines and so on. Ordinary skin and ordinary conductors (for capacitive fingerprint identification sensors), reflective objects (for optical and ultrasonic fingerprint sensors) do not have such detail characteristic points, thus it is easy to determine whether the object that is currently contacting the fingerprint identification area is a finger.

For example, when determining whether the characteristic points are consistent with fingerprint characteristics, it may be determined whether there are characteristic points which are spaced by a preset distance among the characteristic points, or it may be determined whether there is a characteristic point with a preset shape, or it may be determined whether there are bifurcation points, ring points and the like. The aspects of the present disclosure are not limited in this respect.

It is noted that steps 202 and 203 above are performed to determine whether the target object is a finger based on characteristic points. In another aspect, the contour information of the contact area may also be acquired, the contour information indicating the edge shape of the contact area. That is, in the event that the characteristic information is the contour information, it is determined whether the edge shape indicated by the contour information is an oval. If the edge shape is an oval, there is a fingerprint on the contact area of the target object. If the edge shape is not an oval, there is no fingerprint on the contact area of the target object. Of course, the above oval merely means the edge shape is an approximate oval without specifying the edge shape as a standard oval. A certain error in the shape is accepted, such that the feasibility of the implementation may be improved.

In step 204, the fingerprint identification function is started to perform fingerprint identification.

The process of step 204 is a process to start the fingerprint identification function to perform fingerprint identification. During the process, the identification of the user's fingerprint may be implemented by matching based on a preset fingerprint template. The aspects of the present disclosure are not limited in this respect. Of course, if there is no image processing such as image enhancement and the like in the above steps, the section image may firstly be processed in step 204 to improve efficiency of fingerprint identification.

In step 205, if there is no fingerprint on the contact area of the target object, the contact operation is ignored such that the fingerprint identification function is kept in sleep state.

If there is no fingerprint on the contact area, the contact operation may be not responded. That is, the fingerprint identification function is not started and kept in sleep state, thereby the power consumption due to starting the fingerprint identification function whenever the contact operation occurs can be reduced significantly.

In the aspects of the present disclosure, the acquisition of the characteristic information and determination of the contact area may be performed by a fingerprint identification circuit IC within the fingerprint identification area.

In the method provided in the aspect of the present disclosure, when the contact operation to the fingerprint identification area is detected, it is first determined whether the target object is a user's finger, that is, whether there is a fingerprint on the contact area of the target object. If the target object is a user's finger, the contact operation is valid, and then the fingerprint identification function would be started to perform fingerprint identification. If the target object is not a user's finger, the fingerprint identification function would not be started. As a result, unnecessary power consumption due to some misoperations can be avoided.

The above aspects mainly discuss how to reduce the power consumption of the fingerprint identification function itself, and may be applied in any situation where the fingerprint identification function is used, for example, unlock process when the terminal is in lock screen state, or mobile payment of the terminal and the like. Below how to further reduce the power consumption is introduced based on a particular application situation. The inventors realize when the terminal system is under the sleep state, the fingerprint identification process will be started and performed by the terminal system every time the contact operation is detected. The power consumed by the start of the terminal system is high, and there is significant effect on the stand-by time of the terminal if misoperation occurs. As a result, in the event that the terminal system is under the sleep state, when the contact operation of any target object to the fingerprint identification area of the terminal is detected, the characteristic information of the contact area is acquired; it is determined whether there is a fingerprint on the contact area of the target object based on the characteristic information; the terminal system is started and the fingerprint identification function is stared to perform fingerprint identification if there is a fingerprint on the contact area of the target object; and the contact operation is ignored and the terminal system is kept in the sleep state such that the fingerprint identification function is kept in sleep state if there is no fingerprint on the contact area of the target object.

Figure 2B:
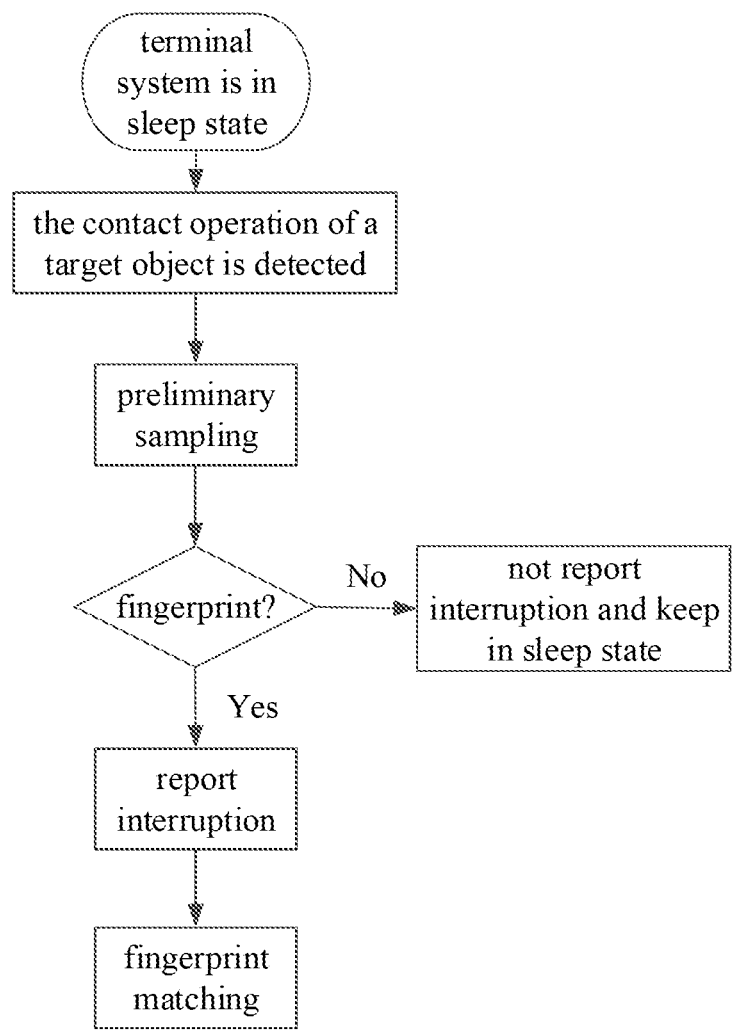
FIG. 2B illustrates a specific flow based on an interrupt mechanism according to an exemplary aspect of the present disclosure.
Figure 2C:
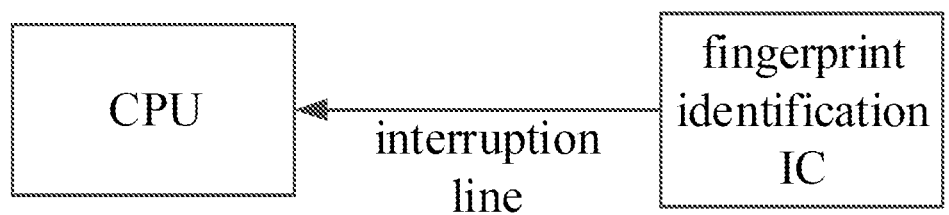
FIG. 2C illustrates connection between a CPU and a fingerprint identification IC according to an exemplary aspect of the present disclosure.

The above methods may be specifically implemented by the interruption mechanism between the fingerprint identification IC and a CPU, as shown in FIGS. 2B and 2C. FIG. 2B illustrates a specific flow based on the interrupt mechanism. FIG. 2C illustrates connection between the CPU and the fingerprint identification IC. If a determination is made that there is a fingerprint on the contact area based on the preliminary collected characteristic information, the fingerprint identification IC may not send interruption signal to the CPU, and the CPU may perform start of the terminal system and subsequent process. If a determination is made that there is no fingerprint on the contact area based on the preliminary sampled characteristic information, the fingerprint identification IC may send interruption signal to the CPU, and the CPU may not perform start of the terminal system and subsequent process after receiving the interruption signal.

In the above methods, in the event that the terminal system is under the sleep state, when the contact operation to the fingerprint identification area is detected, it is first determined whether the target object is a user's finger, that is, whether there is a fingerprint on the contact area of the target object. If the target object is a user's finger, the contact operation is valid, and then the terminal system would be started and the fingerprint identification function would be started to perform fingerprint identification. If the target object is not a user's finger, the terminal system would not be started. As a result, unnecessary power consumption due to some misoperations can be avoided.

Figure 3:
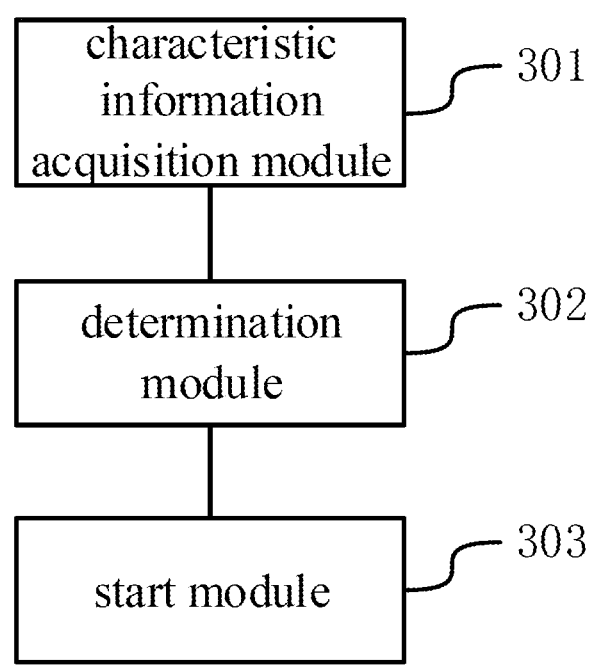
FIG. 3 is a diagram illustrating an apparatus for fingerprint identification according to an exemplary aspect of the present disclosure.

FIG. 3 is a diagram illustrating an apparatus for fingerprint identification according to an exemplary aspect. As shown in FIG. 3, the apparatus for fingerprint identification includes a characteristic information acquisition module 301 configured to acquire, when the contact operation of any target object to the fingerprint identification area of the terminal is detected, the characteristic information of the contact area; a determination module 302 configured to determine whether there is a fingerprint on the contact area of the target object based on the characteristic information; and a start module 303 configured to start the fingerprint identification function to perform fingerprint identification if there is a fingerprint on the contact area of the target object, and to ignore the contact operation such that the fingerprint identification function is kept in sleep state if there is no fingerprint on the contact area of the target object.

In an optional implementation, the characteristic information acquisition module 301 includes: a first acquisition sub-module configured to acquire the section image of the contact area and extract a characteristic point of the contact area from the section image; or a second acquisition sub-module configured to acquire the contour information of the contact area, the contour information indicating the edge shape of the contact area.

In an optional implementation, the determination module 302 includes: a first determination sub-module configured to determine, in the event that the characteristic information is the characteristic point, whether the characteristic point is consistent with fingerprint characteristic, make a determination that there is a fingerprint on the contact area of the target object if the characteristic point is consistent with the fingerprint characteristic, and make a determination that there is no fingerprint on the contact area of the target object if the characteristic point is not consistent with the fingerprint characteristic; or a second determination sub-module configured to determine, in the event that the characteristic information is the contour information, whether the edge shape indicated by the contour information is an oval, make a determination that there is a fingerprint on the contact area of the target object if the edge shape is an oval, and make a determination that there is no fingerprint on the contact area of the target object if the edge shape is not an oval.

In an optional implementation, the start module 303 is further configured to keep, if the terminal system is in sleep state and it is determined that there is no fingerprint on the contact area of the target object, the terminal system in the sleep state while ignoring the contact operation.

In an optional implementation, the apparatus may be applied to a fingerprint identification circuit IC within the fingerprint identification area.

For the apparatuses in the above aspects, specific operations performed by each module have been detailed in related method aspects, and thus detailed description will be omitted here.

Figure 4:
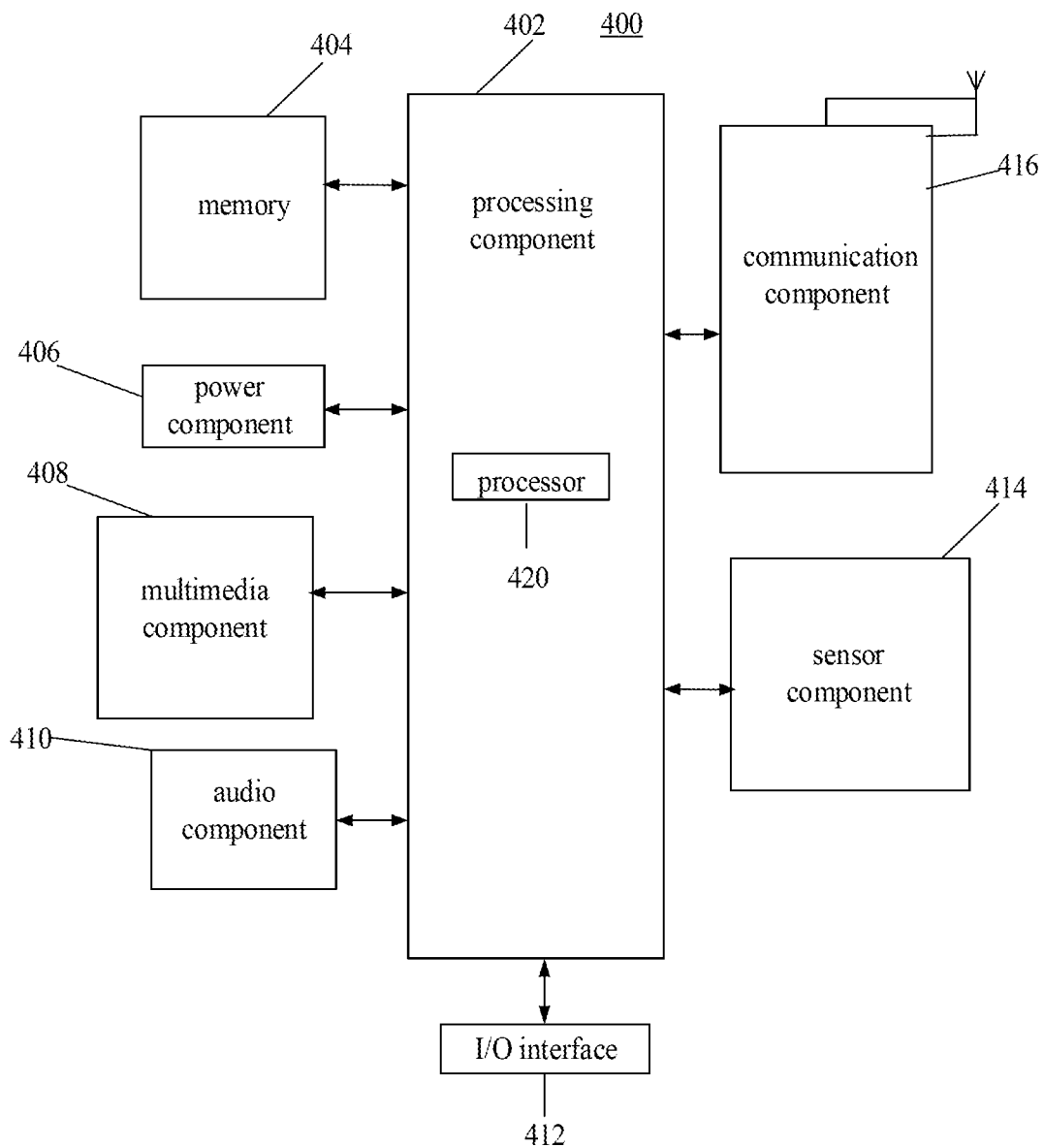
FIG. 4 is a diagram illustrating an apparatus 400 for fingerprint identification according to an exemplary aspect of the present disclosure.

FIG. 4 is a diagram illustrating an apparatus 400 for fingerprint identification according to an exemplary aspect. For example, the apparatus 400 may be a mobile phone, a computer, a digital broadcast terminal, a messaging device, a gaming console, a tablet, a medical device, exercise equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power for the apparatus 400.

The multimedia component 408 includes a screen providing an output interface between the apparatus 400 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 408 includes a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have optical focusing and zooming capability.

The audio component 410 is configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In some aspects, the audio component 410 further includes a speaker to output audio signals.

The I/O interface 412 provides an interface between the processing component 402 and peripheral interface modules, the peripheral interface modules being, for example, a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For instance, the sensor component 414 may detect an open/closed status of the apparatus 400, relative positioning of components (e.g., the display and the keypad, of the apparatus 400), a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of a nearby object without any physical contact. The sensor component 414 may also include a light sensor, such as a CMOS or CCD image sensor, for use in imaging applications. In some aspects, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G, or 3G, or a combination thereof. In an exemplary aspect, the communication component 416 receives a broadcast signal or broadcast associated information from an external broadcast management system via a broadcast channel. In an exemplary aspect, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 404, executable by the processor 420 in the apparatus 400, for performing the above-described methods. For example, the non-transitory computer-readable storage medium may be a ROM, a Random Access Memory (RAM), a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

In the exemplary aspects, a non-transient computer readable storage media having instructions therein is provided, which when executed by a processor of the mobile terminal cause the mobile terminal to perform the above method for fingerprint identification.

Other aspects of the disclosure will be apparent to those skilled in the art from consideration of the specification and practice of the disclosures herein. This application is intended to cover any variations, uses, or adaptations of the disclosure following the general principles of the present disclosure and including such departures from the present disclosure as come within known or customary practice in the art. It is intended that the specification and examples be considered as illustrative only, with a true scope and spirit of the disclosure being indicated by the following claims.

It will be appreciated that the inventive concept is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for fingerprint identification, comprising:
   detecting, when a fingerprint identification function of a terminal is in a sleep state, a contact of an object with a fingerprint identification area of a terminal, wherein the contact of the object covers a contact area on the fingerprint identification area;
   acquiring, when the fingerprint identification function is in the sleep state, characteristic information of the contact area;
   determining, when the fingerprint identification function is in the sleep state, whether the contact area includes a fingerprint based on the characteristic information;
   starting the fingerprint identification function to perform fingerprint identification when it is determined that the contact area includes the fingerprint;
   maintaining the sleep state when it is determined that the contact area does not include the fingerprint; and
   maintaining a terminal system in a sleep state and ignoring the contact when the terminal system is in the sleep state and it is determined that the contact area does not include the fingerprint by configuring an identification integrated circuit (IC) to send an interruption signal to a processor of the terminal system, such that the processor of the terminal system does not perform a start of the terminal system and subsequent process after receiving the interruption signal.

2. The method of claim 1, wherein acquiring the characteristic information of the contact area comprises:
   acquiring a section image of the contact area and extracting a characteristic point of the contact area from the section image;
   determining whether the characteristic point is consistent with a fingerprint characteristic;
   determining that the contact area includes the fingerprint when the characteristic point is consistent with the fingerprint characteristic; and
   determining that the contact area does not include the fingerprint when the characteristic point is not consistent with the fingerprint characteristic.

3. The method of claim 1, wherein acquiring the characteristic information of the contact area comprises:
   acquiring contour information of the contact area, the contour information indicating an edge shape of the contact area;
   determining whether the edge shape indicated by the contour information is an oval;
   determining that the contact area includes the fingerprint when the edge shape is an oval; and
   determining that the contact area does not include the fingerprint when the edge shape is not an oval.

4. The method of claim 1, wherein acquisition of the characteristic information and determination of the contact area is performed by a fingerprint identification integrated circuit (IC) within the fingerprint identification area.

5. An apparatus for fingerprint identification, comprising:
   a processor;
   a memory configured to store instructions executable by the processor, wherein the processor is configured to:
   detect, when a fingerprint identification function of a terminal is in a sleep state, a contact of an object with a fingerprint identification area of a terminal, wherein the contact of the object covers a contact area on the fingerprint identification area;
   acquire, when the fingerprint identification function is in the sleep state, characteristic information of the contact area;
   determine, when the fingerprint identification function is in the sleep state, whether the contact area includes a fingerprint based on the characteristic information;
   start the fingerprint identification function to perform fingerprint identification when it is determined that the contact area includes the fingerprint;
   maintain the sleep state when it is determined that the contact area does not include the fingerprint; and
   maintain a terminal system in a sleep state and ignoring the contact when the terminal system is in the sleep state and it is determined that the contact area does not include the fingerprint by configuring an identification integrated circuit (IC) to send an interruption signal to a processor of the terminal system, such that the processor of the terminal system does not perform a start of the terminal system and subsequent process after receiving the interruption signal.

6. The apparatus of claim 5, wherein the processor is further configured to:
   acquire a section image of the contact area and extract a characteristic point of the contact area from the section image; determine whether the characteristic point is consistent with a fingerprint characteristic;
   determine that the contact area includes the fingerprint when the characteristic point is consistent with the fingerprint characteristic; and
   determine that the contact area does not include the fingerprint when the characteristic point is not consistent with the fingerprint characteristic.

7. The apparatus of claim 5, wherein the processor is further configured to:
   acquire contour information of the contact area, the contour information indicating an edge shape of the contact area;
   determine whether the edge shape indicated by the contour information is an oval;
   determine that the contact area includes the fingerprint when the edge shape is an oval; and
   determine that the contact area does not include the fingerprint when the edge shape is not an oval.

8. The apparatus of claim 5, wherein the apparatus is applied to a fingerprint identification integrated circuit (IC) within the fingerprint identification area.

9. A non-transitory computer-readable medium having instructions stored thereon that when executed by one or more processors of a terminal, cause the terminal to:

detect, when a fingerprint identification function of a terminal is in a sleep state, a contact of an object with a fingerprint identification area of a terminal, wherein the contact of the object covers a contact area on the fingerprint identification area;

acquire, when the fingerprint identification function is in the sleep state, characteristic information of the contact area;

determine, when the fingerprint identification function is in the sleep state, whether the contact area includes a fingerprint based on the characteristic information;

start the fingerprint identification function to perform fingerprint identification when it is determined that the contact area includes the fingerprint;

maintain the sleep state when it is determined that the contact area does not include the fingerprint; and maintain a terminal system in a sleep state and ignoring the contact when the terminal system is in the sleep state and it is determined that the contact area does not include the fingerprint by configuring an identification integrated circuit (IC) to send an interruption signal to a processor of the terminal system, such that the processor of the terminal system does not perform a start of the terminal system and subsequent process after receiving the interruption signal.

10. The computer-readable medium of claim 9, wherein the instructions further cause the terminal to:

acquire a section image of the contact area and extract a characteristic point of the contact area from the section image; determine whether the characteristic point is consistent with a fingerprint characteristic;

determine that the contact area includes the fingerprint when the characteristic point is consistent with the fingerprint characteristic; and determine that the contact area does not include the fingerprint when the characteristic point is not consistent with the fingerprint characteristic.

11. The computer-readable medium of claim 9, wherein the instructions further cause the terminal to:

acquire contour information of the contact area, the contour information indicating an edge shape of the contact area;

determine whether the edge shape indicated by the contour information is an oval;

determine that the contact area includes the fingerprint when the edge shape is an oval; and determine that the contact area does not include the fingerprint when the edge shape is not an oval.

12. The computer-readable medium of claim 9, wherein acquisition of the characteristic information and determination of the contact area is performed by the identification IC within the fingerprint identification area.

* * * * *